(No Model.)

J. H. BLESSING.
REVOLUBLE JOINT FOR SCREW VALVE STEMS.

No. 310,870. Patented Jan. 20, 1885.

Witnesses:

Inventor:

JAMES H. BLESSING,
by William K. Gow
Attorney.

UNITED STATES PATENT OFFICE.

JAMES H. BLESSING, OF ALBANY, NEW YORK.

REVOLUBLE JOINT FOR SCREW VALVE-STEMS.

SPECIFICATION forming part of Letters Patent No. 310,870, dated January 20, 1885.

Application filed July 1, 1884. (No model.)

*To all whom it may concern:*

Be it known that I, JAMES H. BLESSING, of the city and county of Albany, in the State of New York, have invented certain new and useful Improvements in Revoluble Joints for Screw Valve-Stems, of which the following is a specification.

My invention relates to an improved mode of attaching screw-stems to valves by means of a revoluble joint that is constructed in such manner that a rotatory motion can be imparted to the screw-stem without imparting a like motion to the valve; and to this end my invention consists in forming on the upper surface of the valve a central stud provided with a projecting circular flange which forms a head to said stem, and in forming on the lower end of the screw-stem a head which corresponds to the head of the stud on the valve, both of said heads being adapted to fit into a chamber formed by a split coupling that is clamped or fastened around the heads of the screw-stem and valve, in the manner hereinafter set forth.

The object of my invention is to provide a simple and reliable revoluble joint for connecting valves to their operating screw-stems.

Figure 1:
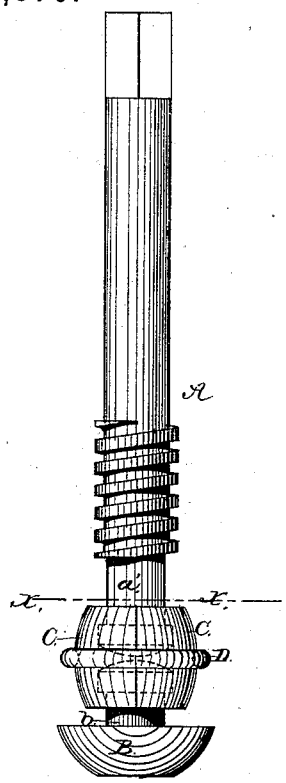
Figure 2:
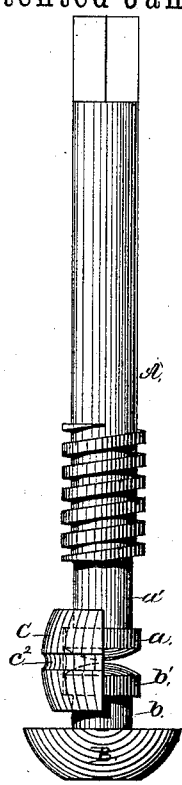
Figure 4:
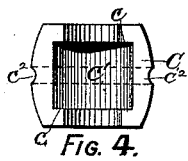
Figure 3:
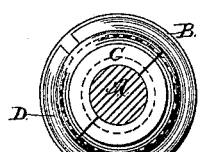

In the accompanying drawings, which—being herein referred to—form part of this specification, Figure 1 is a side elevation of a screw-stem and valve coupled together; Fig. 2, a like elevation with the clamping device and one part of the split coupling removed; Fig. 3, a horizontal section at the line $x\ x$ of Fig. 1, and Fig. 4 an elevation of the chambered side of one of the counterpart parts of the split coupling.

As represented in the drawings, A is the screw-stem; B, the valve; C, the split coupling, and D a spring clamping device.

The screw-stem A is provided on its lower end with a projecting circular flange, $a$, which is made concentric to the neck $a'$ of said screw-stem.

The valve B—which may be made of any desired size and form—has on its upper face a centrally-located cylindrical stud, $b$, whose upper end is provided with a projecting circular flange, $b'$, which corresponds in size and form to the flange $a$ of the screw-stem.

The coupling C is composed of two like parts of an approximate semi-cylindrical form, which are joined together vertically on a diametrical line, each of said parts being provided at both ends with semi-annular flanges, $c$, which are adapted to fit around either the neck $a$ of the screw-stem or the stud $b$ of the valve. A semi-cylindrical chamber, $c'$, is formed between the flanges $c$, and said chamber is of sufficient size to receive the flanges $a$ and $b'$, and permit them to revolve with perfect freedom therein. When the two parts of the coupling are joined together, the inturned flanges $c$ engage the flanges $a$ and $b'$ in such manner that the stem A and valve-stud $b$ will be coupled together in a true line, so as to resist any reasonable tensile strain, but so that each will be free to rotate independently of the other. A circumferential groove, $c^2$, is formed around the outer surface of the coupling C, for the purpose of containing a fastening, whereby the two parts of said coupling are secured in place.

The spring-clamp D is made of wire in the form of a ring, having a radial separation, and of a suitable size to fit into the groove $c^2$, so as to hold the two parts of the coupling securely together; but, when preferred, a binding-wire—without resilient properties—may be substituted for the spring-clamp.

When the valve B is coupled to the screw-stem A in the manner herein shown and described, the said stem may be rotated, after the valve has reached its seat, without imparting a like motion to the valve, and in this manner the danger of producing an abrasive action between the valve and seat is avoided.

I claim as my invention—

The combination, with a screw-stem, A, provided with a circular flange, $a$, and a valve, B, provided with a central stud, $b$, having a circular flange, $b'$, as herein described, of a split coupling, C, adapted to engage with the flanges $a$ and $b'$, and secured in place substantially as herein specified.

JAMES H. BLESSING.

Witnesses:
WM. H. LOW,
JOHN W. WHEELOCK.